United States Patent [19]

Blümer et al.

[11] Patent Number: 4,597,253
[45] Date of Patent: Jul. 1, 1986

[54] FORAGE OR PICKING HARVESTER UNIT

[75] Inventors: Leo Blümer, Rees; Xaver Lenzer, Kötz, both of Fed. Rep. of Germany

[73] Assignee: Karl Mengele & Söhne GmbH & Co., Günzburg/Donau, Fed. Rep. of Germany

[21] Appl. No.: 555,382

[22] Filed: Nov. 28, 1983

[30] Foreign Application Priority Data

Nov. 27, 1982 [DE] Fed. Rep. of Germany ....... 3243955
Apr. 8, 1983 [DE] Fed. Rep. of Germany ....... 3312665

[51] Int. Cl.$^4$ ............................................. A01D 87/10
[52] U.S. Cl. ................... 56/13.4; 56/DIG. 1; 241/101.7
[58] Field of Search ............... 56/DIG. 1, 13.4, 13.9, 56/13.3; 241/101.7, 221, 222, 223, 224

[56] References Cited

U.S. PATENT DOCUMENTS

| | | | |
|---|---|---|---|
| 3,546,861 | 12/1970 | Clendenin | 56/DIG. 1 |
| 3,851,450 | 12/1974 | Nelson | 56/DIG. 1 |
| 3,874,605 | 4/1975 | Fleming | 241/222 |
| 4,196,861 | 4/1980 | Bass et al. | 241/101.7 |
| 4,278,211 | 7/1981 | Shriver | 56/DIG. 1 |
| 4,426,043 | 1/1984 | Martenas | 241/101.7 |

FOREIGN PATENT DOCUMENTS

| | | |
|---|---|---|
| 0058432 | 2/1981 | European Pat. Off. . |
| 2455852 | 12/1980 | France . |
| 686661 | 10/1979 | U.S.S.R. ............ 56/DIG. 1 |

Primary Examiner—Gene Mancene
Assistant Examiner—David I. Tarnoff
Attorney, Agent, or Firm—Toren, McGeady, Stanger, Goldberg & Kiel

[57] ABSTRACT

A forage or picking harvester unit includes a cylindrical cutter followed by an impeller fan with a crushing device in the path between the cutter and the fan. In the cylindrical cutter, the cutting wheel shaft is arranged perpendicularly relative to the shaft of the impeller fan. The crushing device is formed of crushing rollers with the roller axes extending parallel to the cutting wheel shaft. The crushing rollers are positioned in the path of the material flowing from the cylindrical cutter into the impeller fan. The circumferential surfaces of the crushing rollers are fluted in the direction parallel to the roller axes. The fluted surfaces form alternating teeth and recesses so that the circumferential surfaces of the crushing rollers can intermesh.

9 Claims, 2 Drawing Figures

FORAGE OR PICKING HARVESTER UNIT

SUMMARY OF THE INVENTION

The invention is directed to a forage or picking harvester unit with a crushing device utilizing crushing rollers located in the path of material flowing from a cylindrical cutter to a conveying device, such as an impeller fan.

A known rough grinding device of the general type to which the present invention is directed, is disclosed in German Offenlegungsschrift No. 30 00 946 and includes an injector or discharge at the bottom of a cylindrical cutter of a harvester unit so that the material being processed is conveyed through four trough conveyors leading upwardly along an inclined plane into the nip of two crushing rollers. After the material passes between the crushing rollers it experiences a free fall into a conveyor trough which feeds the crushed material to an impeller fan or blower. This harvesting unit is made up of many individual parts, it is very complicated and, accordingly, it is heavy and expensive, as a result, it does not have broad or versatile use.

Therefore, the primary object of the present invention is to provide a less complicated, lighter and more compact unit of the general type mentioned above.

In accordance with the present invention, in a surprisingly simple manner, an impeller fan is connected directly to the outlet from a cylindrical cutter and in the passageway extending between the cylindrical cutter and the impeller fan a pair of counter-rotating crushing rollers are arranged. In this harvesting unit, in particular with the direct connection of the impeller fan to the outlet of the cylindrical cutter so that the cutting wheel axis extends approximately perpendicularly to the axis of the fan, the connecting passageway between the cylindrical cutter and the impeller fan can be utilized for the crushing rollers while providing a compact design.

With regard to the design of crushing rollers no specific rules are available. The size, surface configuration and drive speed of the rollers have been determined based on empirical data derived from mill construction where there has been a grinding of grains, such as for producing flour. Accordingly, it has been known that the crushing of grains can be achieved by higher compressive forces between smaller diameter surfaces with a reduction in the comminution zone and at equal rotational speed of the rollers. Such rough grinding or crushing rollers are sufficient for handling the grain itself but do not adequately process other parts of the grain plant. Accordingly, to avoid possible flow obstructions conveying elements have been utilized.

In a preferred embodiment of the invention, the circumferential surfaces of the crushing rollers are fluted in the direction parallel to the roller axes. The fluted surfaces provide alternating teeth and recesses affording an intermeshing engagement of the rollers. The rollers can be arranged so that the clearance between the teeth is smaller than the grain particle dimensions and the rollers are adjustably positionable relative to one another so as to mesh and they can be driven synchronously, such as by meshing spur wheels.

With this arrangement the parts of the grain plant other than the grain can be readily processed by the crushing rollers so that blockages are avoided in a relatively small passageway containing the rollers.

By means of the present invention, the grain is completely crushed between the fluted surfaces of the crushing rollers and it is not ground with the other parts of the grain plant. The fodder obtained in such a harvesting unit is better adapted to be fed to most animals and it is in a form which can be stored in silos without any major losses. Further, a particularly compact form of the harvester unit is obtained which is easy to handle and maneuver.

Further features of the invention are set forth in the claims.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
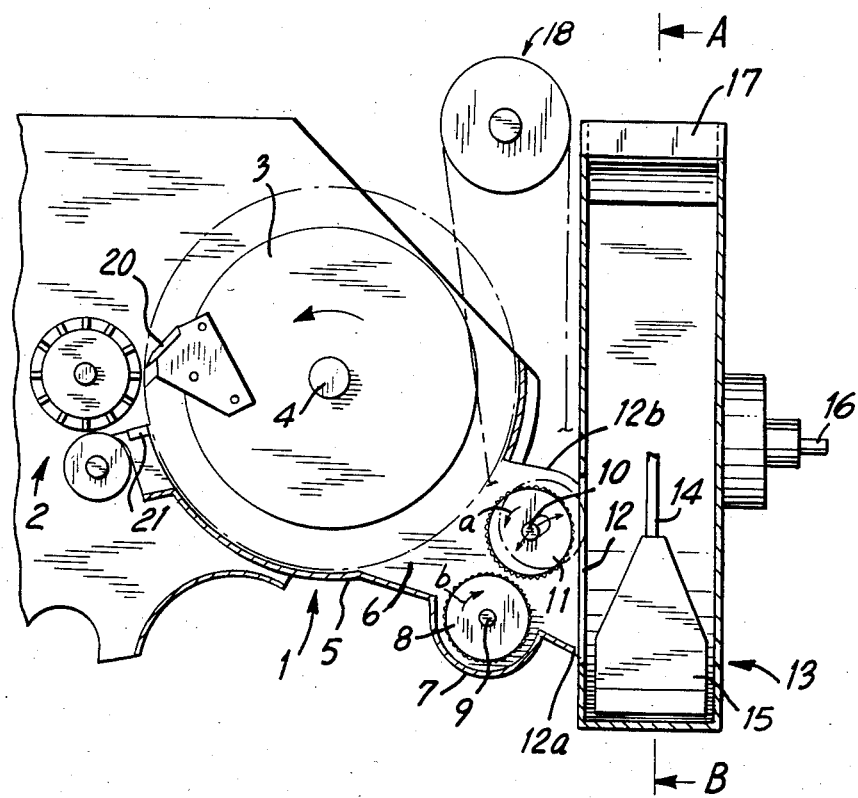
FIG. 1 is a schematic illustration of a forage harvester unit embodying a crushing device according to the present invention.

In FIG. 1 a forage or picking harvester unit is illustrated including a cylindrical cutter 1 and a feed device 2 for directing grain material into the cutter. A cutting or picking member not shown, would be connected ahead of the cylindrical cutter for cutting corn plants or picking ears of corn. A cutting wheel 3 is located within the cylindrical cutter 1 and the wheel rotates with shaft 4. Note the arrow showing the direction of rotation of the wheel 3 and the shaft 4. A base plate 5 is located on the lower side of the cylindrical cutter 1. A bottom outlet or discharge opening 6 is located from the cylindrical cutter 1 and is bounded on the lower side by the base plate 5. The base plate 5 has a bowl-like section 7 spaced outwardly and downwardly from the cutting wheel 3 and a lower crushing roller 8 is positioned in the bowl-like section. Crushing roller 8 rotates along with its shaft 9 in bearings 9a, note FIG. 2. Located above crushing roller 8 and somewhat downstream from it in the outlet 6 is an upper crushing roller 11 which rotates with its shaft 10 in bearings 10a. As can be seen from the arrows a, b, on the crushing rollers 11, 8, the rollers rotate in opposite directions and extend parallel to the shaft 4 of the cutting wheel 3. Adjacent the downstream side of the bowl-like section 7 is an intake section 12a leading into an impeller fan 13 connected downstream of the cylindrical cutter 1. Within the impeller fan, a blade carrier 14 is provided with vanes 15 extending radially outwardly from its outer surface and the support revolves with a central shaft 16. The outer ends of the vanes 15 move along a circle closely spaced from the interior of the housing forming the impeller fan 13. At the upper portion of the housing of the impeller fan 13 there is a discharge 17 for the material being processed. The shaft 16 extends substantially perpendicularly to the cutting wheel shaft 4 and of the axes of the crushing rollers 8, 11.

Figure 2:
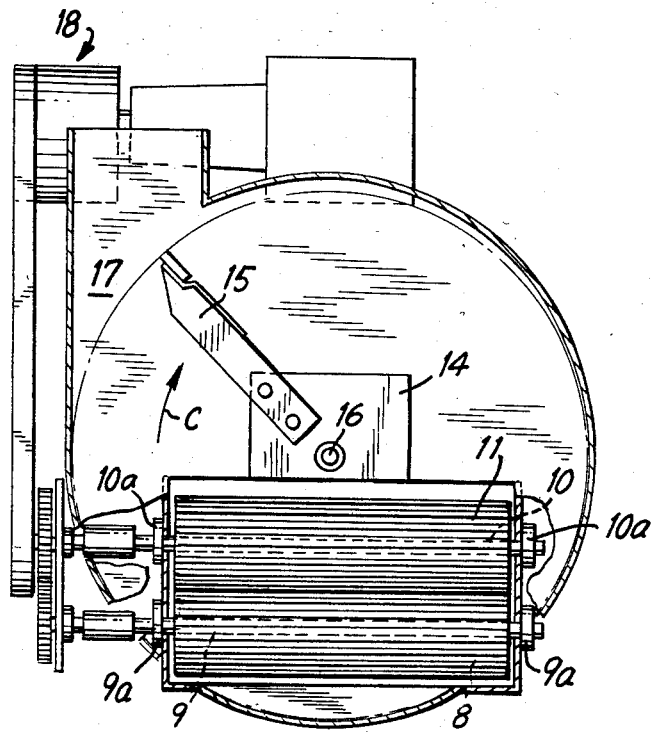
FIG. 2 is a view taken along the line A-B in FIG. 1.

In FIG. 2 the arrow c illustrates the rotational direction of the blade carrier 14. In FIG. 2 the position of the crushing rollers 8, 11 is illustrated which rollers extend approximately for the width of the housing of the cylindrical cutter 1. A drive 18 powers the various parts of the forage or picking harvester.

The harvester embodying the present invention operates in the following manner:

Corn plants or ears of corn are directed into the cylindrical cutter 1 through the cutter inlet and the incoming material is shredded by the cutting unit 20, 21. The material is carried by the cutting wheel 3 downwardly over the base plate 5 and through the cutter outlet into the discharge opening or outlet 6 so that the material enters into the nip between the rapidly rotating crushing rollers 8, 11. As indicated in FIG. 1 by the dash-dot lines, the upper crushing roller 11 is movable in the upward direction with its bearings 10a relative to the lower crushing roller 8. The movement of the upper crushing roller is effected counter to the tension of compression springs, not shown. The minimum spacing of the crushing roller is adjusted relative to one another so that the individual grains of corn are crushed open. In this operation the hard corn cobs are also comminuted, however, the fibrous parts of the corn plant are compressed by the rollers but are not comminuted. The fodder thus processed passing from the crushing rollers, is drawn into the impeller fan 13 through the suction opening 12. The opening 12 is defined at the bottom by an inlet section 12a and at the top by an inlet cover section 12b. The material is conveyed by the vanes or blades 15 in the direction of the arrow c into the discharge outlet 17 and from the outlet into a carriage or transport vehicle.

Spur wheels of equal size drive the crushing rollers 8, 11. As can be seen in FIG. 1, the circumferential surface of the crushing rollers are fluted providing alternating teeth and recesses so that the rollers can mesh with a certain clearance. As shown in FIG. 1, by the dash-dot lines, the position of the upper crushing roller 11 can be adjusted relative to the lower crushing roller 8. A device, not shown, provides the adjustment of the rollers so that the grains of corn are crushed to the desired extent. Grinding of the grains is avoided due to the synchronous running of the crushing rollers 8, 11 and also due to the meshed interengagement of the circumferential surfaces of the rollers. The teeth formed in the fluted surfaces may have a triangular tooth cross-sectional form. The depth of the sides of the teeth or the fluted surfaces has an approximate ratio relative to the dedendum circle diameter of the crushing rollers 8, 11 in the range of 1:6 to 1:8.

The crushing rollers 8, 11 are mounted in their bearings 9a, 10a so that they can be removed or exchanged. To facilitate the mounting of the crushing rollers, the bearings can be retained in snap closures.

While specific embodiments of the invention have been shown and described in detail to illustrate the application of the inventive principles, it will be understood that the invention may be embodied otherwise without departing from such principles.

We claim:

1. Forage or picking harvester unit for grain material including a cylindrical cutter including a cutter housing having a cutter inlet and a cutter outlet for the grain material, an impeller fan for receiving the grain material from a discharge outlet, and a crushing device located in the flow of the grain material between said cylindrical cutter and said impeller fan, wherein the improvement comprises a vertically arranged cutting wheel rotatably mounted about a horizontal axis within said cutter housing, said cutting wheel having a radially outer circumferential edge, said housing including an arcuately shaped base plate extending directly adjacent to and shaped to conform to a part of said circumferential edge below the horizontal axis of said cutting wheel and between said cutter inlet and said cutter outlet, a part of asid base plate extending downwardly and outwardly from said cutter outlet and forming a bowl-like section spaced from said cutter outlet with said base plate inclined downwardly from said bowl-like section to said impeller fan, said impeller fan comprises a vertically arranged fan casing having a fan inlet and a fan outlet and said fan inlet is connected directly to the cutter outlet, said discharge outlet comprises wall means forming a rectangularly shaped elongated channel extending generally obliquely downwardly from said circumferential edge to said cutter outlet and with said wall means including said part of said base plate extending downwardly and outwardly from said cutter outlet and having said bow-like section and said part inclined downwardly from said bowl-like section forming the lower side of said channel along with a pair of spaced side walls extending upwardly from said base plate and a top wall opposite said base plate, and said crushing device comprising a pair of crushing rollers located in said channel with said rollers rotating in opposite directions and arranged so that the grain material entering said channel from said cutter housing passes through said channel between said crushing rollers, said crushing rollers being horizontally arranged and spaced from said cutter outlet and having fluted circumferentially extending surfaces with the fluted surfaces extending in the axial direction of said rollers, said crushing rollers being adjustable for providing a smaller clearance therebetween than the thickness of the grain material passing between the rollers, one of said crushing rollers located within said bowl-like section of said base plate spaced downwardly from the other said crushing roller and the other said crushing roller located closer to said fan inlet than said one crushing roller, and the other said crushing roller spaced closely adjacent to said top wall of said channel and the circumferential surface of said other said crushing roller spaced outwardly from said circumferential edge of said cutting wheel so that the grain material moving along the circumferential edge is directed between said crushing rollers.

2. Forage or picking harvester unit, as set forth in claim 1, wherein said fluted surfaces form a triangular tooth cross-sectional form.

3. Forage or picking harvester unit, as set forth in claim 1, wherein the depth of the fluted surfaces has an approximate ratio to the dedendum circle diameter of said crushing rollers in the range 1:6 to 1:8.

4. Forage or picking harvester unit, as set forth in claim 1, wherein said other crushing roller is adjustably mounted for movement toward and away from said one crushing roller and for movement toward and away from said impeller fan.

5. Forage or picking harvester unit, as set forth in claim 1, wherein said impeller fan has a shaft extending horizontally and substantially perpendicularly of the axes of said cylindrical cutter.

6. Forage or picking harvester unit, as set forth in claim 1, including means for driving said crushing rollers at equal speed and said crushing rollers are formed of cast iron.

7. Forage or picking harvester unit, as set forth in claim 1, including means for driving said other crushing roller at a higher speed than said lower crushing one.

8. Forage or picking harvester unit, as set forth in claim 1, including bearings for said crushing rollers and wherein said crushing rollers along with said bearings are removably mounted.

9. Forage or picking harvester unit, as set forth in claim 8, wherein snap closures are provided for retaining said crushing rollers and said bearings thereof.

* * * * *